No. 630,077. Patented Aug. 1, 1899.
S. C. SCHAUER.
ENGINE LATHE.
(Application filed Jan. 12, 1899.)
(No Model.)

WITNESSES.
N. E. Carr,
John Francis.

Sherman C. Schauer, INVENTOR.
By Robert S. Carr
Atty.

THE NORRIS PETERS CO., PHOTO-LITHO., WASHINGTON, D. C.

UNITED STATES PATENT OFFICE.

SHERMAN C. SCHAUER, OF HAMILTON, OHIO.

ENGINE-LATHE.

SPECIFICATION forming part of Letters Patent No. 630,077, dated August 1, 1899.

Application filed January 12, 1899. Serial No. 702,000. (No model.)

*To all whom it may concern:*

Be it known that I, SHERMAN C. SCHAUER, a citizen of the United States, and a resident of Hamilton, Ohio, have invented certain new and useful Improvements in Engine-Lathes, of which the following is a specification.

My invention relates to engine-lathes; and the object of my improvement is to provide a tool-rest that may be raised or lowered, that carries the tool in a horizontal plane, and that is removable from the carriage. This object is attained in the following-described manner, as illustrated in the accompanying drawings, in which—

Figures 1, 2:
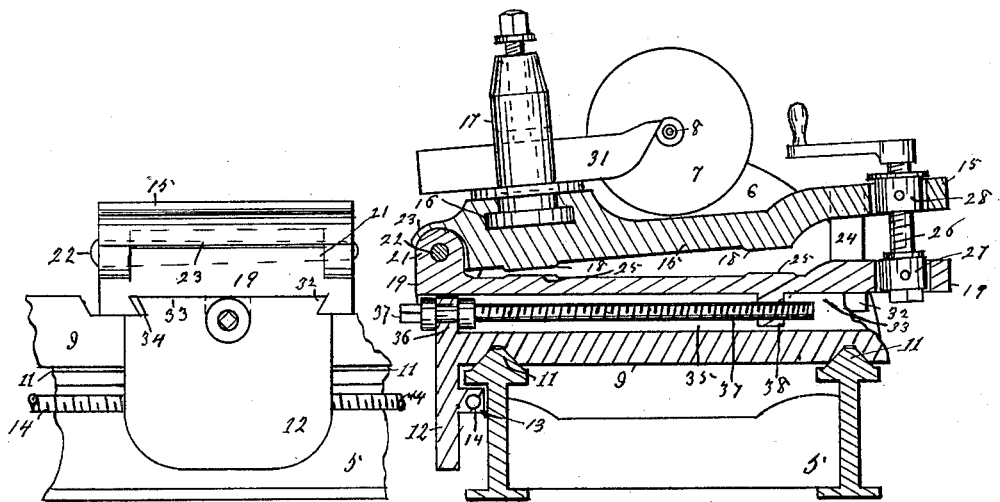
Figures 3, 4:
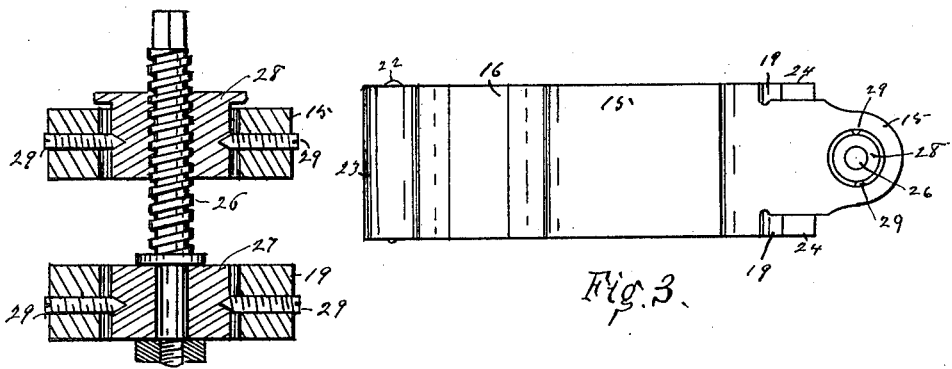

Figure 1 is a longitudinal section of the tool-rest in position on a lathe; Fig. 2, an end elevation of portions of Fig. 1; Fig. 3, a plan of the rest, and Fig. 4 a transverse section in the plane of the adjusting-screw.

In the drawings, 5 represents the bed, 6 the head-stock mounted thereon, 7 the face-plate, and 8 the live center, of an ordinary lathe. Carriage 9 rides on V-shaped ways 11, and apron 12 depends from the front side thereof. Lead-screw nut 13, secured to the apron, detachably engages with lead-screw 14, that is journaled on the bed and under the apron. The lead-screw is driven by pinions (not shown) to effect the movement of the carriage along the ways.

Tool-rest 15 is formed with a transverse slot 16 near its front end for the engagement therein of tool-post 17. Feet 18 are formed across and project below the under surface of the tool-rest and near its respective ends. The front end of the tool-rest is movably secured to the front end of base 19 by means of a strong hinge 21. Taper pin 22 forms the pintle of said hinge and is adapted to take up the wear and keep the hinge in perfect adjustment. Lip 23, formed on the front end of the tool-rest, projects over the hinge and protects it from dirt.

Base 19 is formed with parallel guides 24, that project vertically from its rear portion and on opposite sides of the tool-rest to prevent any lateral movement thereof. Seats 25 are raised across the top surface of the base and near its respective ends to register with the corresponding feet 18 on the tool-rest.

Adjusting-screw 26 is journaled in collar 27 and threaded in nut 28. To prevent said screw from binding, the collar and nut are swiveled by means of pivot-screws 29 in openings formed in the rear ends of the base 19 and tool-rest 15, respectively, as shown in Fig. 4. By means of the adjusting-screw the tool-rest and tool 31 thereon may be vertically adjusted more or less from the base. Base 19 is movably mounted on carriage 9 by means of groove 32, formed in its under surface, engaging with a corresponding rib or tenon 33, formed across the top surface of the carriage. Said groove and rib in cross-section resemble the form of a dovetail, and any wear between them may be taken up by a gib 34.

Longitudinal trough 35, formed in rib 33, is open at the rear end and closed at its front end by abutment 36, formed integral with the carriage. Feed-screw 37 is journaled near one of its ends in said abutment 36 and projects rearwardly in trough 35. Nut 38 is secured on base 19 and depends therefrom within said trough. Feed-screw 37 is threaded in said nut to effect the movement of the base, tool-rest, and tool 31 thereon in a direction across the carriage and to the extent necessary to properly adjust the tool to the work to be performed.

By means of the vertical adjustment of the tool-rest on the base the tool is always carried in a horizontal direction by the movement of the base on the carriage. The rest may be lowered by the adjusting-screw until feet 18 are firmly seated on the corresponding seats 25 on the base, when the tool will be carried as rigidly in performing its work as by a solid tool-rest.

The tool-rest is quickly and easily removable from the carriage in a rearward direction, that other rests suited to different classes of work may be as easily and quickly placed in position thereon.

Having fully described my improvement, what I claim as my invention, and desire to secure by Letters Patent, is—

The combination with a base arranged to be movably and detachably engaged with a plain lathe-carriage, raised seats formed thereon and guides projecting above opposite sides of its rear portion and parallel with each other of a tool-rest hinged at its front end to the front end of the base and movable between the guides, feet depending therefrom and arranged to register with the respective seats on the base and an adjusting-screw swiveled on the base and arranged to clamp the tool-rest on the base with the feet in solid contact with the respective seats or adjustably support said rest above the base and between the guides as desired.

SHERMAN C. SCHAUER.

Witnesses:
R. S. CARR,
JAMES GATES CARR.